(12) United States Patent
Burghardt

(10) Patent No.: US 7,823,920 B1
(45) Date of Patent: Nov. 2, 2010

(54) INFLATABLE VEHICLE OCCUPANT PROTECTION DEVICE WITH INFLATION FLUID DEFLECTOR

(75) Inventor: Wilfried Burghardt, Sterling Heights, MI (US)

(73) Assignee: TRW Vehicle SAfety Systems Inc., Washington, MI (US)

(*) Notice: Subject to any disclaimer, the term of this patent is extended or adjusted under 35 U.S.C. 154(b) by 0 days.

(21) Appl. No.: 12/485,255

(22) Filed: Jun. 16, 2009

(51) Int. Cl.
B60R 21/26 (2006.01)
(52) U.S. Cl. ........................ 280/736; 280/731
(58) Field of Classification Search ............... 280/731, 280/736
See application file for complete search history.

(56) References Cited

U.S. PATENT DOCUMENTS

| | | | |
|---|---|---|---|
| 5,018,762 A | 5/1991 | Suzuki et al. | |
| 5,860,672 A * | 1/1999 | Petersen | 280/728.2 |
| 6,113,134 A | 9/2000 | Lim | |
| 6,155,599 A | 12/2000 | Bowers et al. | |
| 6,679,518 B2 * | 1/2004 | Varcus et al. | 280/728.2 |
| 6,824,163 B2 | 11/2004 | Sen et al. | |
| 6,886,855 B2 * | 5/2005 | Cheal et al. | 280/741 |
| 7,063,348 B2 | 6/2006 | Webber et al. | |
| 7,083,185 B2 | 8/2006 | Fangmann et al. | |
| 7,341,273 B2 * | 3/2008 | Massanetz et al. | 280/728.2 |
| 7,401,809 B2 * | 7/2008 | Lube | 280/739 |
| 7,513,527 B2 * | 4/2009 | Lube et al. | 280/736 |
| 7,559,574 B2 * | 7/2009 | Magoley et al. | 280/736 |
| 7,694,997 B2 * | 4/2010 | Burghardt et al. | 280/728.2 |
| 2001/0045734 A1 | 11/2001 | Damman et al. | |
| 2002/0084634 A1 | 7/2002 | Adomeit et al. | |
| 2003/0085553 A1 | 5/2003 | Ford et al. | |
| 2005/0212274 A1 * | 9/2005 | Massanetz et al. | 280/740 |
| 2006/0267320 A1 * | 11/2006 | Lube | 280/735 |

* cited by examiner

*Primary Examiner*—Toan C To
(74) *Attorney, Agent, or Firm*—Tarolli, Sundheim, Covell & Tummino LLP

(57) ABSTRACT

An apparatus (10) includes an inflatable protection device (14) having an upper portion (60) and a lower portion (62) and an inflator (32) having inflation fluid outlets (33). The inflator (32) is actuatable to inflate the protection device (14). A retainer (70) includes a base portion (72) for clamping the inflator (32) to a support member (34). The retainer (70) further includes a cover portion (74) that has a deflector portion (86) and a top portion (88). The deflector portion (86) directs inflation fluid from the inflator (32) into the protection device (14) in a direction substantially parallel to a central axis (37) of the inflator (32). The cover portion (74) directs inflation fluid from a first half (74a) of the cover portion (74) into the upper portion (60) of the protection device (14) at a first volumetric flow rate and from a second half (74b) of the cover portion (74) into the lower portion (62) of the protection device (14) at a second volumetric flow rate that is greater than the first volumetric flow rate.

20 Claims, 12 Drawing Sheets

INFLATABLE VEHICLE OCCUPANT PROTECTION DEVICE WITH INFLATION FLUID DEFLECTOR

TECHNICAL FIELD

The present invention relates to an inflatable vehicle occupant protection device for helping to protect an occupant of a vehicle upon the occurrence of an event for which occupant protection is desired, such as a vehicle collision.

BACKGROUND OF THE INVENTION

It is known to provide an inflatable vehicle occupant protection device, such as an air bag, for helping to protect an occupant of a vehicle. A driver frontal air bag is inflatable between an occupant of a front seat of the vehicle and the steering wheel of the vehicle. When inflated, the air bag helps protect an occupant from impacts with parts of the vehicle, such as the steering wheel of the vehicle. During inflation, it may be desirable to prevent immediate contact between the air bag and inflation fluid exiting an inflator.

SUMMARY OF THE INVENTION

The present invention is directed to an apparatus for helping to protect an occupant of a vehicle. The apparatus comprises an inflatable vehicle occupant protection device having an upper portion and a lower portion. An inflator has a flange and inflation fluid outlets. The inflator is actuatable to provide inflation fluid through the inflation fluid outlets to inflate the protection device. A retainer comprises a base portion for clamping the flange of the inflator to a support member. The retainer further includes a cover portion. The cover portion has a deflector portion that extends transversely from the base portion and a top portion that extends transversely from the deflector portion. The cover portion includes a plurality of openings for providing fluid communication between the inflation fluid outlets and the protection device. The deflector portion directs inflation fluid from the inflator into the protection device in a direction substantially parallel to a central axis of the inflator. The cover portion directs the inflation fluid from a first half of the cover portion into the upper portion of the protection device at a first volumetric flow rate. The cover portion directs inflation fluid from a second half of the cover portion into the lower portion of the protection device at a second volumetric flow rate that is greater than the first volumetric flow rate.

The present invention is also directed to an apparatus for helping to protect an occupant of a vehicle. The apparatus comprises an inflatable vehicle occupant protection device having an upper portion and a lower portion. An inflator has a flange and inflation fluid outlets. The inflator is actuatable to provide inflation fluid through the inflation fluid outlets for inflating the protection device. A retainer receives the inflator. The retainer comprises a base portion for clamping the flange of the inflator to a support member. The retainer also includes a cover portion. The cover portion has a deflector portion that extends transversely from the base portion and a top portion that extends transversely from the deflector portion. The cover portion has a first half that includes a plurality of openings and a second half that includes a plurality of openings. The openings in the first and second halves provide fluid communication between the inflation fluid outlets and the protection device. The deflector portion directs inflation fluid from the inflator into the protection device in a direction substantially parallel to a central axis of the inflator. The cover portion directs the inflation fluid from the first half of the cover portion into the upper portion of the protection device at a first volumetric flow rate. The cover portion directs inflation fluid from the second half of the cover portion into the lower portion of the protection device at a second volumetric flow rate that is greater than the first volumetric flow rate.

BRIEF DESCRIPTION OF THE DRAWINGS

The foregoing and other features of the present invention will become apparent to those skilled in the art to which the present invention relates upon reading the following description with reference to the accompanying drawings, in which.

DETAILED DESCRIPTION

Figure 1:
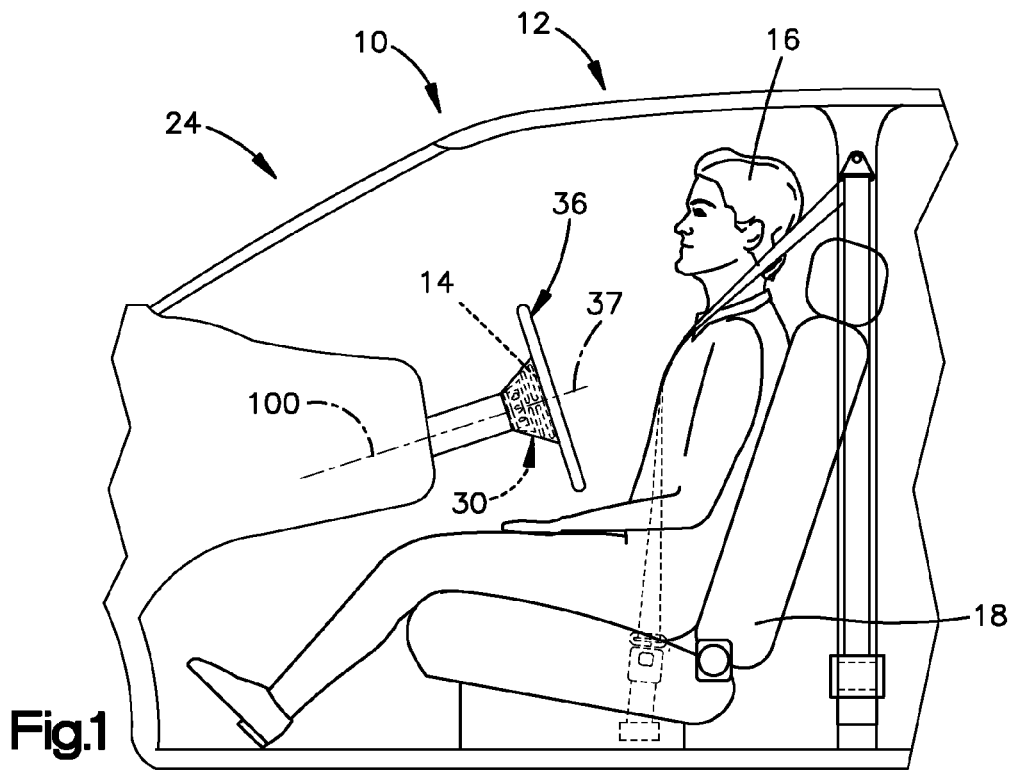
FIG. 1 is a schematic illustration of an apparatus for helping to protect an occupant of a vehicle according to the present invention.
Figure 2:
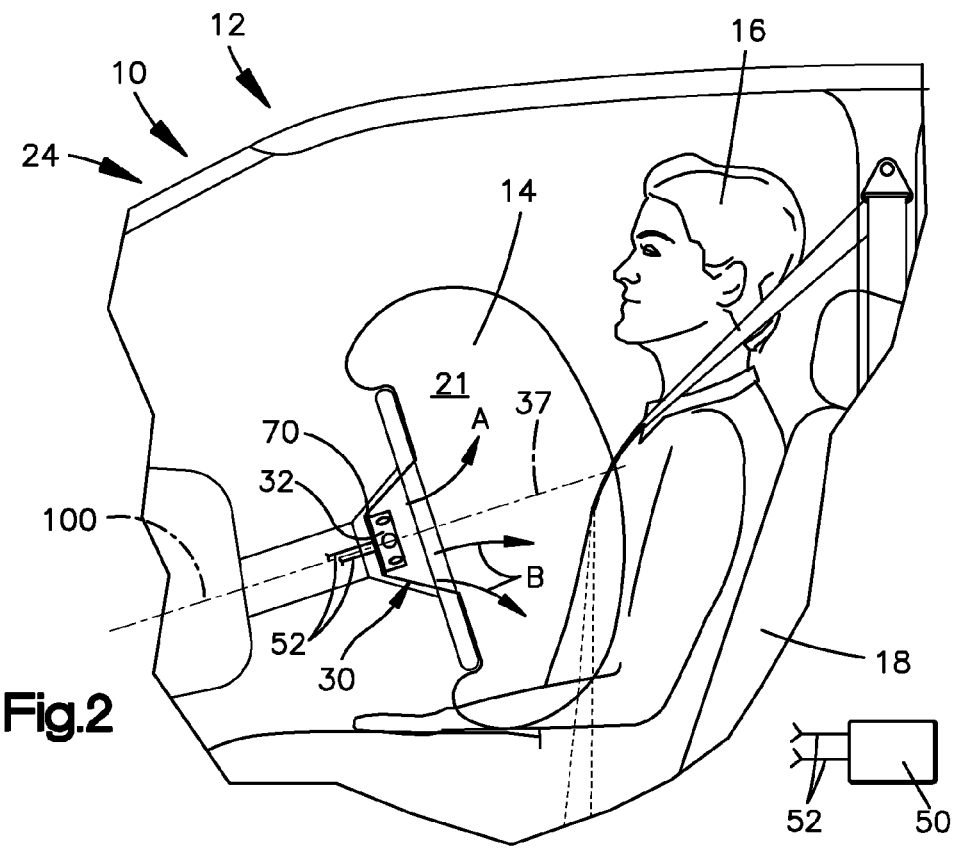
FIG. 2 is a schematic view illustrating the apparatus of FIG. 1 in a deployed condition.

The present invention relates to an inflatable vehicle occupant protection device for helping to protect an occupant of a vehicle upon the occurrence of an event for which occupant protection is desired, such as a vehicle collision. Representative of the present invention, FIGS. 1 and 2 illustrate an apparatus 10 for helping to protect an occupant 16 of a vehicle 12. The apparatus 10 includes an inflatable vehicle occupant protection device 14 in the form of an air bag for helping to protect the vehicle occupant 16. The occupant 16 illustrated in FIGS. 1 and 2 is an operator of the vehicle 12 positioned in a seat 18 on a driver side of the vehicle. The air bag 14 illustrated in FIGS. 1 and 2 thus may be referred to as a driver frontal air bag.

Figure 3:
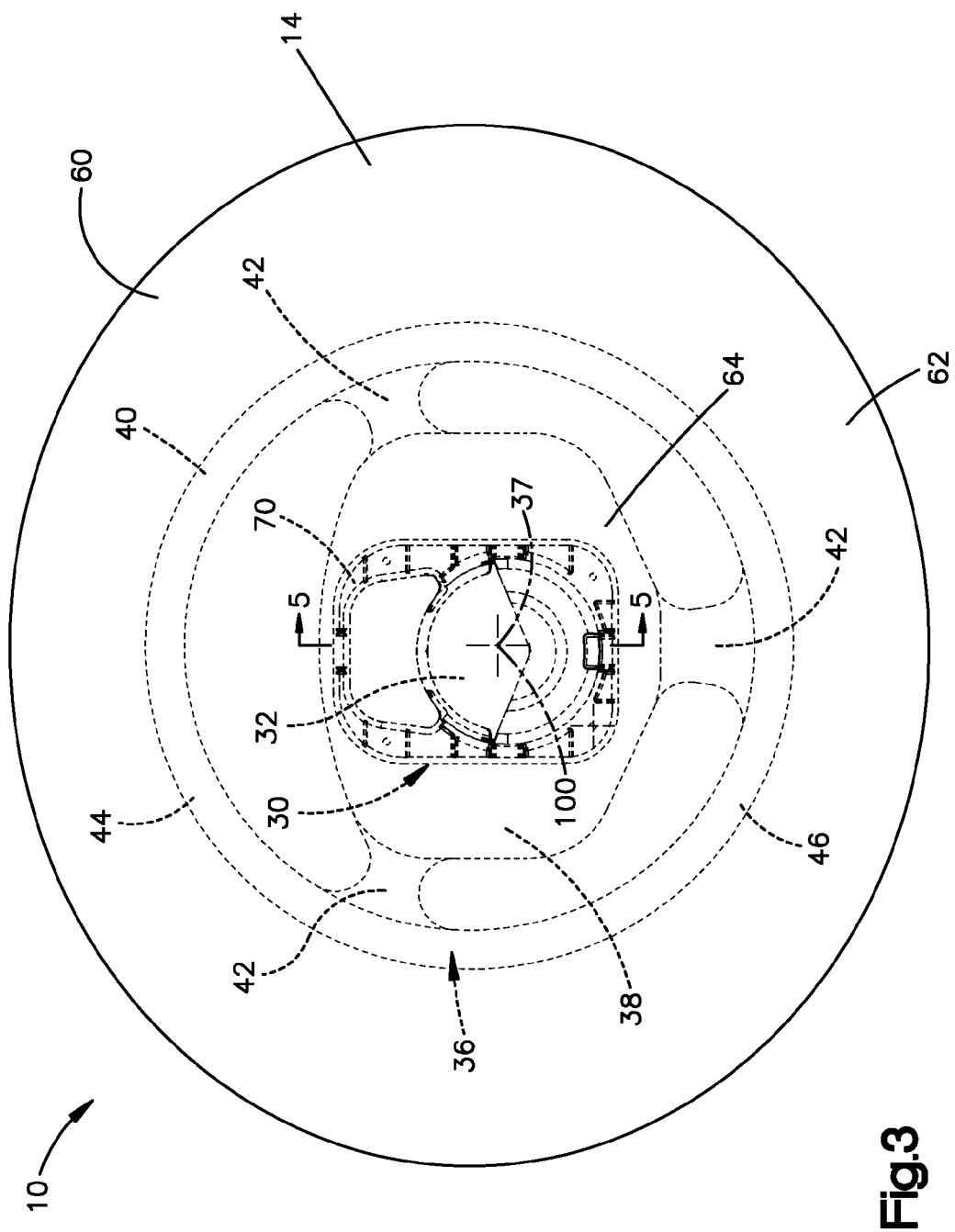
FIG. 3 is a frontal view of a portion of the apparatus of FIGS. 1 and 2.

The air bag 14 is a component of an air bag module 30 that includes an inflation fluid source 32 in the form of an inflator. The air bag module 30 is connected to a steering wheel 36. As shown in FIG. 3, the steering wheel 36 has a central hub 38, a rim 40, and a plurality of spokes 42 that interconnect the hub and the rim. The steering wheel rim 40 has an upper portion 44 and a lower portion 46 and rotates about a central axis 100.

The air bag 14 has a stored condition, indicated by dashed lines in FIG. 1, in which the air bag is folded and secured to a support member, such as a reaction plate 34 (see FIG. 5) that is connected to the steering wheel 36. The reaction plate 34 may thus help support the air bag 14, inflator 32, and other components of the air bag module 30 on the steering wheel 36.

The air bag 14 can be constructed of any suitable material, such as nylon (e.g., woven nylon 6-6 yarns), and may be constructed in any suitable manner. For example, the air bag 14 may include one or more pieces or panels of material. If more than one piece or panel is used, the pieces or panels may be interconnected by known means, such as stitching, ultrasonic welding, heat bonding, or adhesives, to form the air bag. The air bag 14 may be uncoated, coated with a material, such as a gas impermeable urethane, or laminated with a material, such as a gas impermeable film. The air bag 14 thus may have a gas-tight or substantially gas-tight construction. Those skilled in the art will appreciate that alternative materials, such as polyester yarn, and alternative coatings, such as silicone, may also be used to construct the air bag 14.

Figure 4:
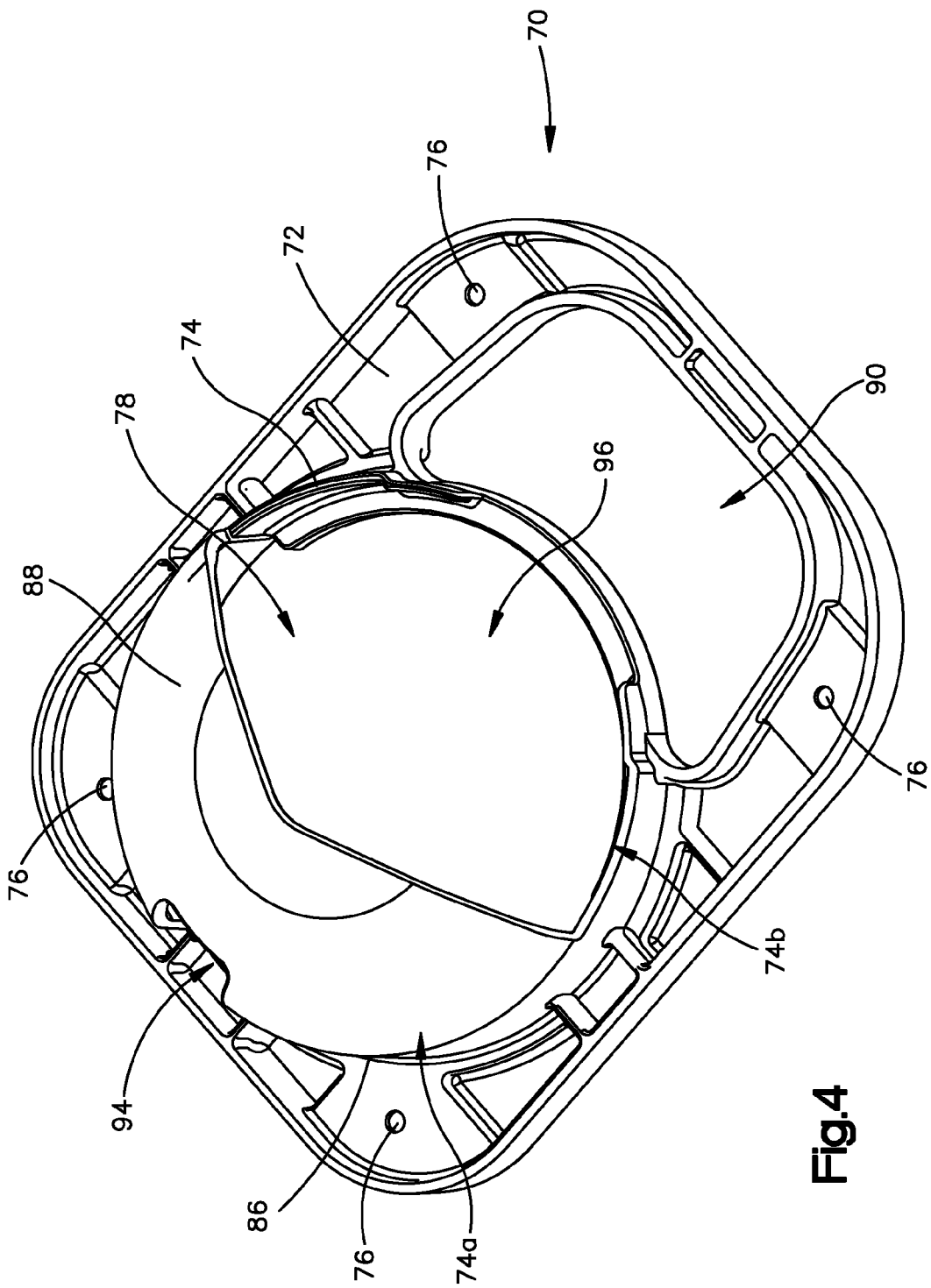
FIG. 4 is a perspective view of a portion of the apparatus of FIGS. 1-3 in accordance with a first embodiment of the present invention.
Figure 5:
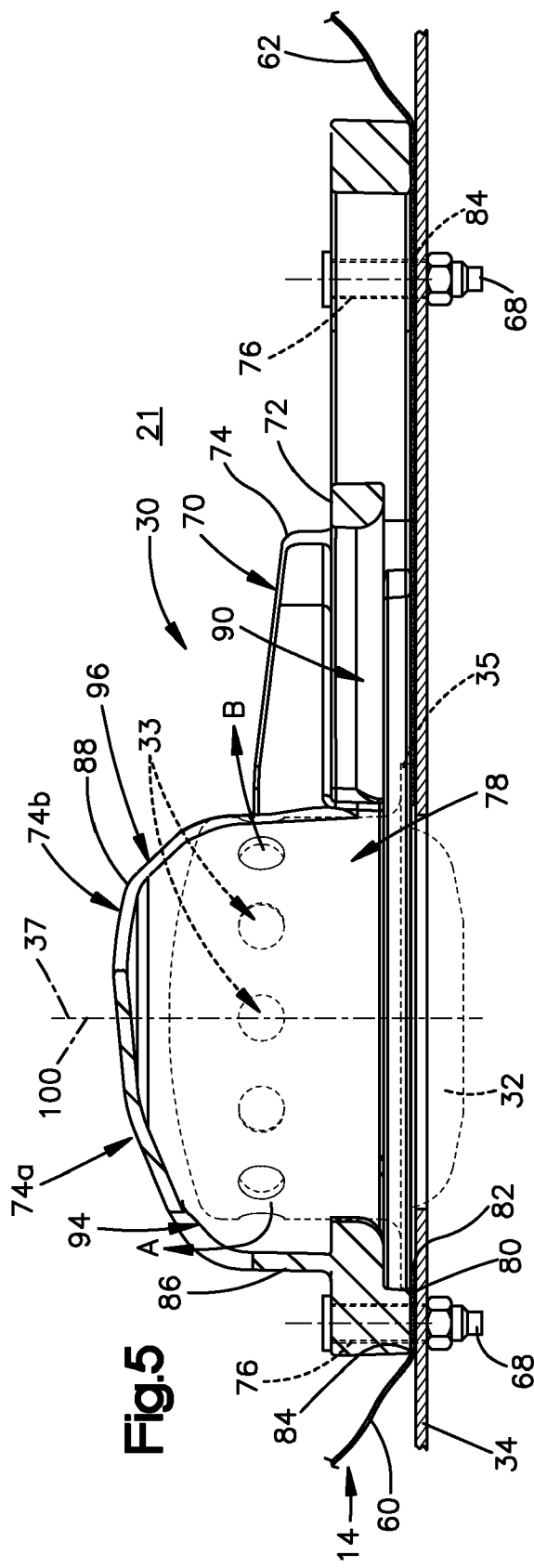
FIG. 5 is a sectional view taken generally along line 5-5 in FIG. 3 and illustrating an installed condition of the apparatus.

Referring to FIGS. 3-5, the inflator 32 is actuatable to provide inflation fluid to an inflatable volume 21 of the air bag 14 to inflate and deploy the air bag. The inflator 32 is illustrated schematically and may be of any known type, such as a stored gas inflator, a solid propellant inflator, an augmented inflator, or a hybrid inflator. In the embodiment illustrated in FIGS. 3-5, the inflator 32 has a generally rounded, cylindrical configuration. The inflator 32 includes a plurality of inflation fluid outlets 33 distributed around its periphery. The inflator 32 is positioned relative to the steering wheel 36 such that a central axis 37 of the inflator is co-axial with the central axis 100 of the steering wheel.

The apparatus 10 also includes a sensor, illustrated schematically at 50 in FIG. 2, for sensing an event for which inflation of the air bag 14 is desired, such as a vehicle impact. The inflator 32 is operatively connected to the sensor 50 via lead wires 52. Upon sensing the occurrence of an event for which inflation of the air bag 14 is desired, the sensor 50 provides a signal to the inflator 32 via the lead wires 52. Upon receiving the signal from the sensor 50, the inflator 32 is actuated and provides inflation fluid to the air bag 14 in a known manner to inflate and deploy the air bag from the stored condition (FIG. 1) to the deployed condition (FIG. 2). The air bag 14, while inflated, helps protect the vehicle occupant 16. As best shown in FIG. 3, when in the deployed condition, the air bag 14 has an upper portion 60 positioned adjacent the upper portion 44 of the steering wheel rim 40, and a lower portion 62 positioned adjacent the lower portion 46 of the steering wheel rim.

During operation of the vehicle 12 in a straight ahead direction, the upper portion 44 of the steering wheel rim 40 is positioned in proximity with the upper torso of the vehicle occupant 16 and, thus, the upper portion 60 of the air bag 14 helps protect the upper torso of the vehicle occupant. Likewise, the lower portion 46 of the steering wheel rim 40 is positioned in proximity with the lower torso of the vehicle occupant 16 and, thus, the lower portion 62 of the air bag 14 helps protect the lower torso of the vehicle occupant.

Referring to FIGS. 4 and 5, the apparatus 10 also includes a retainer 70 for helping to secure the inflator 32 and the air bag 14 to the reaction plate 34 and for helping to direct the flow of inflation fluid from the inflator into the inflatable volume 21 of the air bag 14. The retainer 70 may be constructed of any suitable material, such as metal or plastic, and includes a base portion 72 and a cover portion 74. The base portion 72 has a generally planar, ring-shaped configuration.

In the embodiment illustrated in FIGS. 4-5, the periphery of the base portion 72 has a generally rectangular ring-shaped configuration. The periphery of the base portion 72 could, however, have an alternative configuration (not shown), such as a generally round or rounded ring-shaped configuration. The base portion 72 includes a plurality of holes 76 for receiving fasteners 68. Alternatively, the fasteners 68 may be integrally formed with the base portion 72, e.g., molded into the plastic of the base portion. Although four holes 76 and corresponding fasteners 68 are illustrated, those having ordinary skill in the art will appreciate that more or fewer fasteners may be used.

The fasteners 68 cooperate with the base portion 72 of the retainer 70 to secure the retainer to a support member of the vehicle 12, such as the reaction plate 34. In doing so, the base portion 72 of the retainer 70 may secure the inflator 32 to the reaction plate 34. In particular, the base portion 72 defines a central opening 78 of the retainer 70 and is configured to secure or clamp a flange portion 35 of the inflator 32 to the reaction plate 34. The central opening 78 has a diameter that is less than the diameter of the flange portion 35 of the inflator 32.

In this instance, during installation, the inflator 32 is maneuvered and positioned relative to the central opening 78 of the retainer 70 such that the flange portion 35 of the inflator 32 is clamped between the base portion 72 and the reaction plate 34 when the retainer is secured to the reaction plate via the fasteners 68. The reaction plate 34 may include structure (not shown) for receiving the flange portion 35 of the inflator 32 to hold and position the inflator in the central opening 78 of the retainer 70.

The retainer 70 may also help secure the air bag 14 to the vehicle 12. Referring to FIG. 5, the air bag 14 includes a mouth portion 80 that defines an opening 82. The mouth portion 80 includes a plurality of holes 84, spaced about the periphery of the opening 82, that align with the holes 76 of the retainer 70. The mouth portion 80 of the air bag 14 is positioned between the base portion 72 of the retainer 70 and the flange portion 35 of the inflator 32 on one side and the reaction plate 34 on the other side. Stud portions of the fasteners 68 are installed through the aligned holes 76 and 84 in the retainer 70 and the air bag 14, and through corresponding holes in the reaction plate 34. Nut portions of the fasteners 68 are then installed onto the stud portions thereby to interconnect the air bag 14, inflator 32, retainer 70, and reaction plate 34 to help form the air bag module 30. In this configuration, the fluid outlets 33 of the inflator 32 are positioned within the inflatable volume 21 of the air bag 14.

Those having ordinary skill in the art will appreciate that the air bag module 30 may have additional features or alternative configurations. For example, it may be desirable to provide a gas-tight connection between the mouth portion 80 of the air bag 14, the base portion 72 of the retainer 70, and the reaction plate 34. Accordingly, the reaction plate 34 and the base portion 72 of the retainer 70 may include mating structure (not shown) adjacent to the mouth portion 80 of the air bag 14 to help form a gas-tight connection. Furthermore, it may be desirable to provide at least one vent opening 90 in the base portion 72 of the retainer 70 in order to vent inflation fluid from the air bag 14 as the air bag expands.

According to the present invention, the cover portion 74 of the retainer 70 extends from the base portion 72 and includes a deflector portion 86 and a top portion 88. The deflector portion 86 extends transversely relative to the base portion 72 and the top portion 88 extends transversely from the deflector portion. The top portion 88 has a generally domed construction and covers a portion or all of the inflator 32 such that the inflation outlets 33 are positioned, in a direction parallel to the axis 37, between the top portion and the base portion 72. The cover portion 74 is provided with a plurality of openings (described below) that place the inflation outlets 33 in fluid communication with the air bag 14. The openings may be provided in the top portion 88, the deflector portion 86 or both the top portion and the deflector portion.

The cover portion 74 may be divided into a first half 74a positioned on one side of the central axes 37, 100 corresponding to the upper portion 60 of the air bag 14 and a second half 74b positioned on the other side of the central axes corresponding to the lower portion 62 of the air bag. Although the inflation fluid outlets 33 may be spaced uniformly around the periphery of the inflator 32 such that inflation fluid is emitted from the inflator in a substantially uniform manner, e.g., uniform in terms of volumetric flow rate, the cover portion 74 is constructed such that the volumetric flow rate of the inflation fluid into the air bag 14 is not uniform. In particular, the openings in the cover portion 74 are configured such that inflation fluid is directed from the first half 74a of the cover portion at a first volumetric flow rate and from the second half 74b of the cover portion at a second volumetric flow rate that is greater than the first volumetric flow rate.

The openings include a first opening 94 in the first half 74a of the cover portion 74 and a second opening 96 substantially in the second half 74b of the cover portion. The second opening 96 is larger than the first opening 94. The openings 94 and 96 extend entirely through the cover portion 74 and provide fluid communication between the inflation fluid outlets 33 and the inflatable volume 21 of the air bag 14. The inflation outlets 33 may be aligned with the openings 94 and 96 in the cover portion 74 or the inflation outlets may be offset from the openings. In the embodiment of FIGS. 3-5, certain of the inflation outlets 33 are aligned with the openings 94 and 96. Depending on the size of each opening 94 or 96, more than one inflation outlet 33 may be aligned with that particular opening.

The openings 94 and 96 may have placements different than those illustrated in FIGS. 3-5. For example, in the embodiment of FIGS. 3-5, the opening 94 is illustrated as being located in the first half 74a of the cover portion 74 and the second opening 96 is illustrated as being located primarily in the second half 74b of the cover portion. The first and second openings 94 and 96 could, however, have alternative placements and constructions. Also, the first half 74a, the second half 74b, or both the first and second halves may include a greater number of openings while still providing uneven volumetric flow rates through the first and second halves of the cover portion 74 in accordance with the present invention.

The deflector portion 86 is configured to direct inflation fluid exiting one or more of the openings 94 and 96 in the cover portion 74 into the inflatable volume 21 of the air bag 14 in a direction substantially parallel to the central axis 37 of the inflator 32. This helps prevent inflation fluid from being discharged directly from the inflator 32 into contact with the air bag 14 as the inflation fluid initially exits the inflator outlets 33 and the opening(s) in the cover portion 74. The deflector portion 86 extends parallel to the central axis 37 of the inflator 32 and transversely relative to the base portion 72 of the retainer 70. The deflector portion 86 may, for example, extend orthogonal to the base portion 72. The deflector portion 86 may constitute a single, continuous wall extending around a portion or the entire circumference of the cover portion 74. Alternatively, the deflector portion 86 may constitute a series of discrete, spaced apart wall sections extending around all or a portion of the circumference of the cover portion 74.

In order to direct the inflation fluid exiting one or more of the openings 94 and 96 in the cover portion 74, the deflector portion 86 is provided adjacent the opening(s) and radially outward from the opening(s) relative to the central axis 37. This also places the deflector portion 86 in alignment with any of the inflation outlets 33 aligned with that particular opening.

Advantageously, the cover portion 74 is configured such that, where the deflector portion 86 is provided, inflation fluid exiting the inflator outlets 33 and passing through an opening 94 or 96 in the cover portion 74 initially strikes the deflector portion before striking the air bag 14. In particular, the deflector portion 86 is configured to cover a substantial portion of the area of the each aligned inflator outlet 33. By "covers a substantial portion of the area of an inflator outlet", it is meant that the deflector portion 86 is positioned relative to the aligned inflator outlets 33 such that a substantial portion of the volumetric flow of inflation fluid exiting the inflator outlets is deflected by the deflector portion.

Viewing the inflator outlets 33 perpendicular to the axis 100, the deflector portion 86 covers or overlies a substantial portion of the aligned inflator outlets. The deflector portion 86 may, for example, cover at least 75% of the total area of aligned inflator outlets 33. Those having ordinary skill in the art, however, will appreciate that the deflector portion 86 may alternatively cover more or less of the total area of the aligned inflator outlets 33. It will also be understood that where the deflector portion 86 covers an inflator outlet 33, the deflector portion may cover at least 75% of the total area of that particular outlet, but the deflector portion may not cover every inflator outlet. In other words, some inflator outlets 33 may not be covered at all by the deflector portion 86, but those outlets that are covered have at least 75% of their total area covered.

In the embodiment illustrated in FIGS. 4-5, the deflector portion 86 is positioned adjacent the opening 94 in the first half 74a of the cover portion 74. The deflector portion 86, by extending transversely relative to the base portion 72 of the retainer 70 and covering a substantial portion of the area of the inflator outlets 33 aligned with the opening 94, directs the inflation fluid exiting the first half 74a of the cover portion away from the air bag 14 in a direction substantially parallel to the central axis 37 of the inflator 32. Directing the inflation fluid in this manner helps prevent inflation fluid from initially being discharged directly from the inflator 32 into contact with the air bag 14 and, thus, avoids immediate contact between inflation fluid exiting the inflator and the air bag.

During operation of the apparatus 10 the inflation fluid exits the inflation outlets 33 uniformly within the cover portion 74. In the first half 74a of the cover portion 74, the inflation fluid flows through the first opening 94, strikes the deflector portion 86, and is directed in a direction, indicated generally at A in FIG. 5, upwards and parallel to the central axis 37 and into the upper portion 60 of the air bag 14. In the second half 74b of the cover portion 74, the inflation fluid flows through the second opening 96 and directly into the lower portion 62 of the air bag 14 in a direction, indicated generally at B in FIG. 5, substantially parallel to the base portion 72 since there is no deflector portion provided adjacent to the second opening.

If the deflector portion 86 were provided on the second half 74b of the cover portion adjacent the second opening 96 (not shown), the inflation fluid would flow through the second opening, strike the deflector portion, and be directed upwards and parallel to the central axis 37 and into the lower portion 62 of the air bag 14. In any case, since the first opening 94 is smaller than the second opening 96, the volumetric flow rate of the inflation fluid out of the first half 74a of the cover portion 74 is smaller than the volumetric flow rate of the inflation fluid out of the second half 74b of the cover portion.

Consequently, for a given period of inflation time, the upper portion 60 of the air bag 14 may receive a lower volume of inflation fluid than the lower portion 62 of the air bag. The apparatus 10 of the present invention therefore may be especially advantageous in meeting desired inflation characteristics for helping to protect the vehicle occupant 20 when sitting in close proximity to the steering wheel 36, such as when the occupant's seat 18 is in a forward position.

Figure 6:
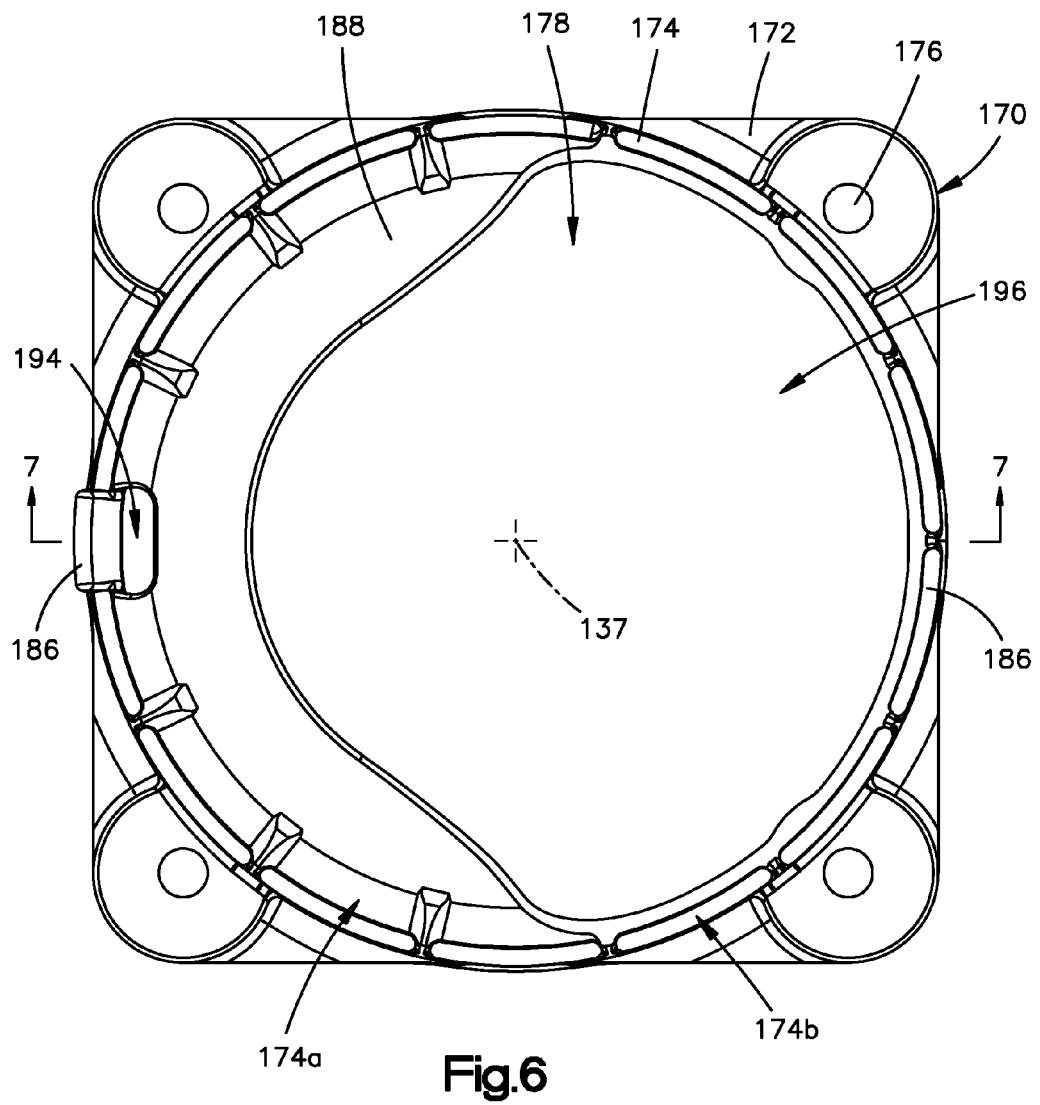
FIG. 6 is a top view of a portion of the apparatus of FIGS. 1 and 2 in accordance with a second embodiment of the present invention.
Figure 7:
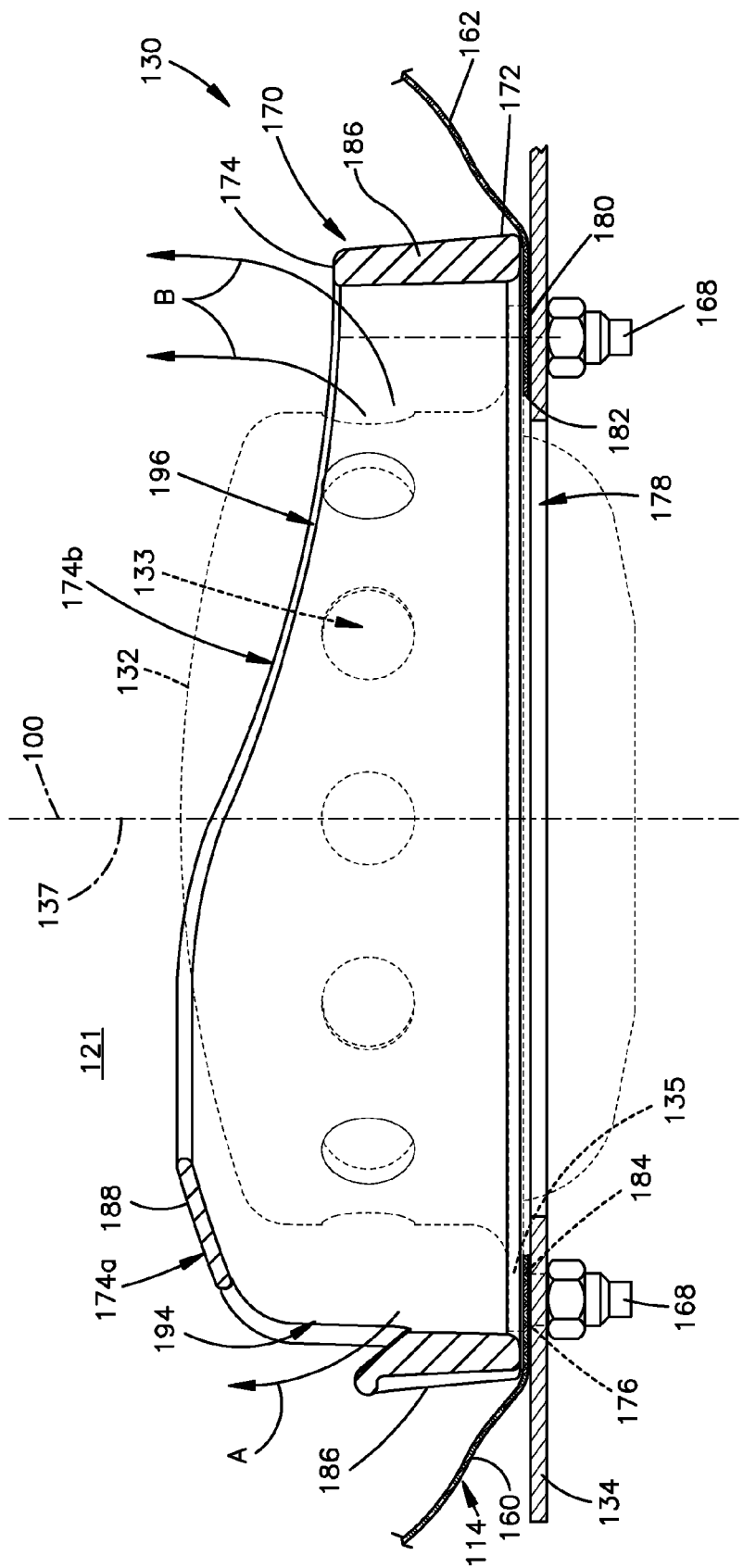
FIG. 7 is a sectional view taken generally along line 7-7 in FIG. 6 and illustrating an installed condition of the apparatus.

A retainer 170 according to a second embodiment of the present invention is illustrated in FIGS. 6-7. The retainer 170 of the second embodiment is similar to the retainer 70 of FIGS. 3-5, with the primary exception that the cover portion 174 of the second embodiment differs from that of the first embodiment as described herein. Furthermore, the base portion 172 of the retainer 170 of the second embodiment does not include a vent opening.

The retainer 170 illustrated in FIGS. 6-7 secures an inflator 132 to a reaction plate 134 and directs the flow of inflation fluid from the inflator into an inflatable volume 121 of an air bag 114. The retainer 170 has a plastic, e.g. injection molded plastic, construction. Those having skill in the art, however, will appreciate that the retainer 170 could be constructed with alternative materials, such as metal. The retainer 170 includes a base portion 172 and a cover portion 174.

The base portion 172 has a generally planar, ring-shaped configuration. In the embodiment illustrated in FIGS. 6 and 7, the periphery of the base portion 172 has a generally rectangular ring-shaped configuration. The periphery of the base portion 172 could, however, have an alternative configuration (not shown), such as a generally round or rounded ring-shaped configuration. The base portion 172 includes a plurality of holes 176 for receiving fasteners 168 (see FIG. 7). Alternatively, the fasteners 168 may be integrally formed with the base portion 172, e.g., molded into the plastic of the base portion. Although four holes 176 and corresponding fasteners 168 are illustrated, those having ordinary skill in the art will appreciate that more or fewer fasteners may be used.

The fasteners 168 cooperate with the base portion 172 of the retainer 170 to secure the retainer to a support member of the vehicle 12, such as the reaction plate 134. In doing so, the base portion 172 of the retainer 170 may secure the inflator 132 to the reaction plate 134. In particular, the base portion 172 defines a central opening 178 of the retainer 170 and is configured to secure or clamp a flange portion 135 of the inflator 132 to the reaction plate 134. The central opening 178 has a diameter that is less than the diameter of the flange portion 135 of the inflator 132.

In this instance, during installation, the inflator 132 is maneuvered and positioned relative to the central opening 178 of the retainer 170 such that the flange portion 135 of the inflator 132 is clamped between the base portion 172 and the reaction plate 134 when the retainer is secured to the reaction plate via the fasteners 168. The reaction plate 134 may include structure (not shown) for receiving the flange portion 135 of the inflator 132 to hold and position the inflator in the central opening 178 of the retainer 170.

The retainer 170 may also help secure the air bag 114 to the vehicle 12. Referring to FIG. 7, the air bag 114 includes a mouth portion 180 that defines an opening 182. The mouth portion 180 includes a plurality of holes 184, spaced about the periphery of the opening 182, that align with the holes 176 of the retainer 170. The mouth portion 180 of the air bag 114 is positioned between the base portion 172 of the retainer 170 and the flange portion 135 of the inflator 132 on one side and the reaction plate 134 on the other side. Stud portions of the fasteners 168 are installed through the aligned holes 176 and 184 in the retainer 170 and the air bag 114, and through corresponding holes in the reaction plate 134. Nut portions of the fasteners 168 are then installed onto the stud portions to thereby interconnect the air bag 114, inflator 132, retainer 170, and reaction plate 134 to help form an air bag module 130. In this configuration, the fluid outlets 133 of the inflator 132 are positioned within the inflatable volume 121 of the air bag 114.

Those having ordinary skill in the art will appreciate that the air bag module 130 may have additional or alternative configurations. For example, it may be desirable to provide a gas-tight connection between the mouth portion 180 of the air bag 114, the base portion 172 of the retainer 170, and the reaction plate 134. Accordingly, the reaction plate 134 and the base portion 172 of the retainer 170 may include mating structure (not shown) adjacent to the mouth portion 180 of the air bag 114 to help form a gas-tight connection.

In the embodiment of FIGS. 6-7, the openings in the cover portion 174 include a first opening 194 located in the first half 174a of the cover portion and a second opening 196 located primarily in the second half 174b of the cover portion, The second opening 196 is larger than the first opening 194. The openings 194 and 196 extend entirely through the cover portion 174 and provide fluid communication between the inflation fluid outlets 133 and the air bag 114. As with the openings 94 and 96, each of the openings 194 and 196 is aligned with one or more inflation outlets 133.

The openings 194 and 196 are similar to the openings 94 and 96 with the exception that the opening 196 is occupies a larger amount of the first half 174a of the cover portion 174 than the opening 96 occupies of the first half 74a of the cover portion 74. The particular configuration of the openings 194 and 196 in the cover is tailored to meet specific inflation criteria for the air bag 114 and, thus, the openings could have alternative placements and constructions. Regardless, the openings 194 and 196 are configured to provide uneven volumetric flow rates through the first and second halves 174a, 174b of the cover portion 174.

The inflation fluid outlets 133 may be spaced uniformly around the periphery of the inflator 132 such that inflation fluid is emitted from the inflator in a substantially uniform manner, e.g., uniform in terms of volumetric flow rate. Nonetheless, the openings 194 and 196 in the cover portion 174 of the second embodiment are configured such that the inflation fluid exiting the first half 174a of the cover portion 174 has a first volumetric flow rate and the inflation fluid exiting the second half 174b of the cover portion has a second volumetric flow rate that is greater than the first volumetric flow rate.

Unlike the deflector portion 86, the deflector portion 186 is configured to direct inflation fluid from both the first half 174a and the second half 174b of the cover portion 174 into the inflatable volume 121 of the air bag 114 in a direction substantially parallel to the central axis 137 of the inflator 132. This helps prevent inflation fluid from being discharged directly from the inflator 132 into contact with the air bag 114 as the inflation fluid initially exits the inflator outlets 133. The deflector portion 186 extends parallel to the central axis 137 of the inflator 132 and perpendicular to the base portion 172 of the retainer 170. Similar to the deflector portion 86, the deflector portion 186 may be a continuous wall or a series of discrete wall sections spaced radially outward from the openings 194 and 196 in the cover portion 174 along the circumference of the cover portion.

The deflector portion 186 is positioned adjacent to both the opening 194 in the first half 174a of the cover portion 174 and the opening 196 in the second half 174b of the cover portion.

Due to this configuration, the deflector portion 186 covers a substantial area of all the inflation outlets 133 aligned with the openings 194 and 196. The deflector portion 186, by extending substantially orthogonal to the base portion 172 of the retainer 170 and covering a substantial area of the aligned inflator outlets 133, directs the inflation fluid exiting the opening 194 in the first half 174a of the cover portion 174 away from the mouth portion 180 of the air bag 114 in a direction, indicated generally by arrow A in FIG. 7, substantially parallel to the central axis 137 of the inflator 132. The deflector portion 186 likewise directs the inflation fluid exiting the opening 196 in the second half 174b of the cover portion 174 away from the mouth portion 180 of the air bag 114 in a direction, indicated generally by arrow B in FIG. 7, substantially parallel to the central axis 137 of the inflator 132. Directing the inflation fluid in this manner helps prevent inflation fluid from initially being discharged directly from the inflator 132 into contact with the air bag 114 and, thus, avoids immediate contact between inflation fluid exiting the inflator and the air bag.

During operation of the inflator 132, the inflation fluid exits the inflation outlets 133 uniformly within the cover portion 174. In the first half 174a of the cover portion 174, the inflation fluid flows through the first opening 194, strikes the deflector portion 186, and is directed upwards and parallel to the central axis 137 and into the upper portion 160 of the air bag 114 in the direction A. In the second half 174b of the cover portion 174, the inflation fluid flows out of the second opening 196, strikes the deflector portion 186, and is directed upwards and parallel to the central axis 137 and into the lower portion 162 of the air bag 114 in the direction B. Since the first opening 194 is smaller than the second opening 196, the volumetric flow rate of the inflation fluid through the first half 174a of the cover portion 174 is smaller than the volumetric flow rate of the inflation fluid out of the second half 174b of the cover portion. Consequently, for a given period of inflation time, the upper portion 160 of the air bag 114 may receive a lower volume of inflation fluid than the lower portion 162 of the air bag to meet desired air bag inflation characteristics.

Figure 8:
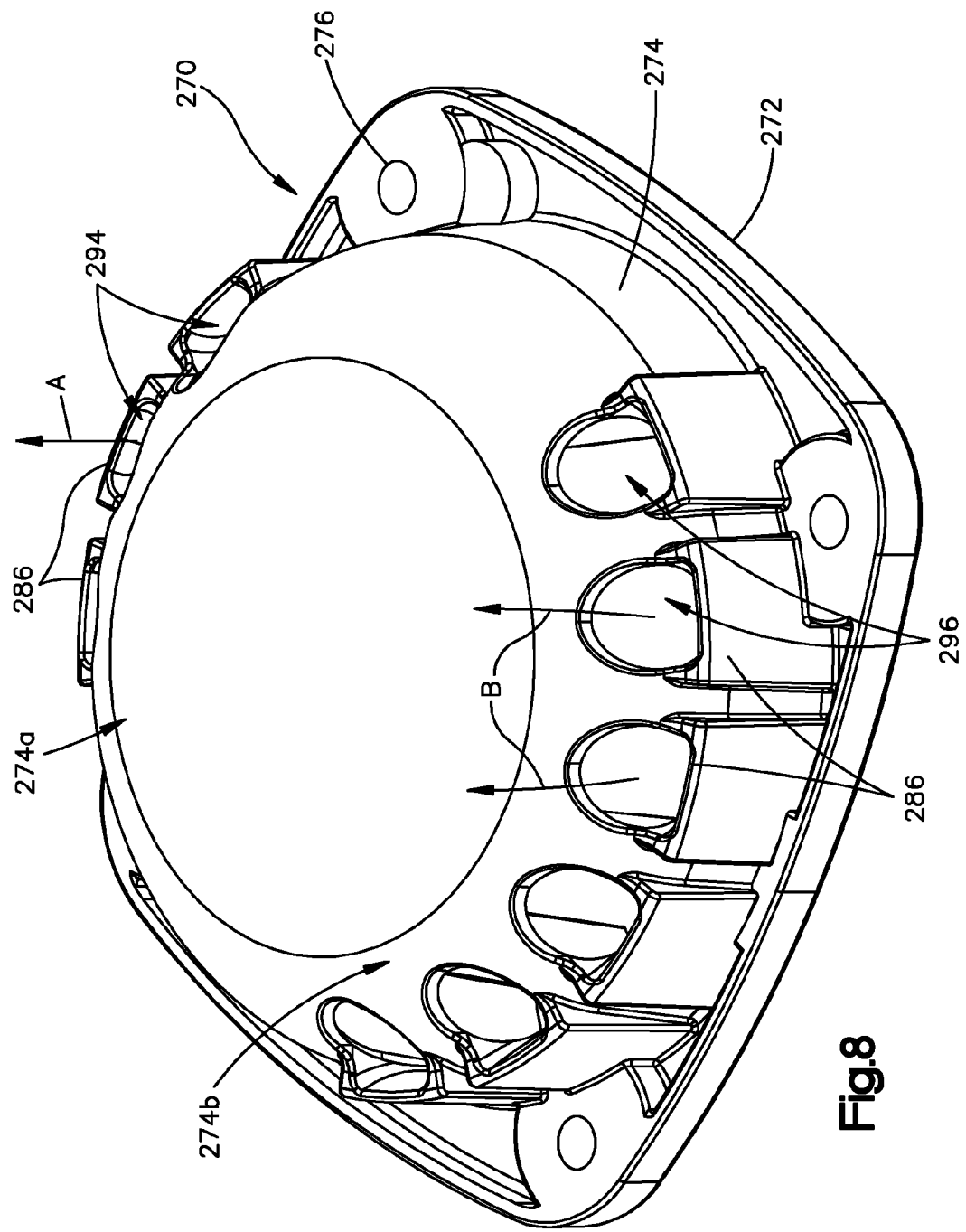
FIG. 8 is a perspective view of a portion of the apparatus of FIGS. 1 and 2 in accordance with a third embodiment of the present invention.
Figure 9:
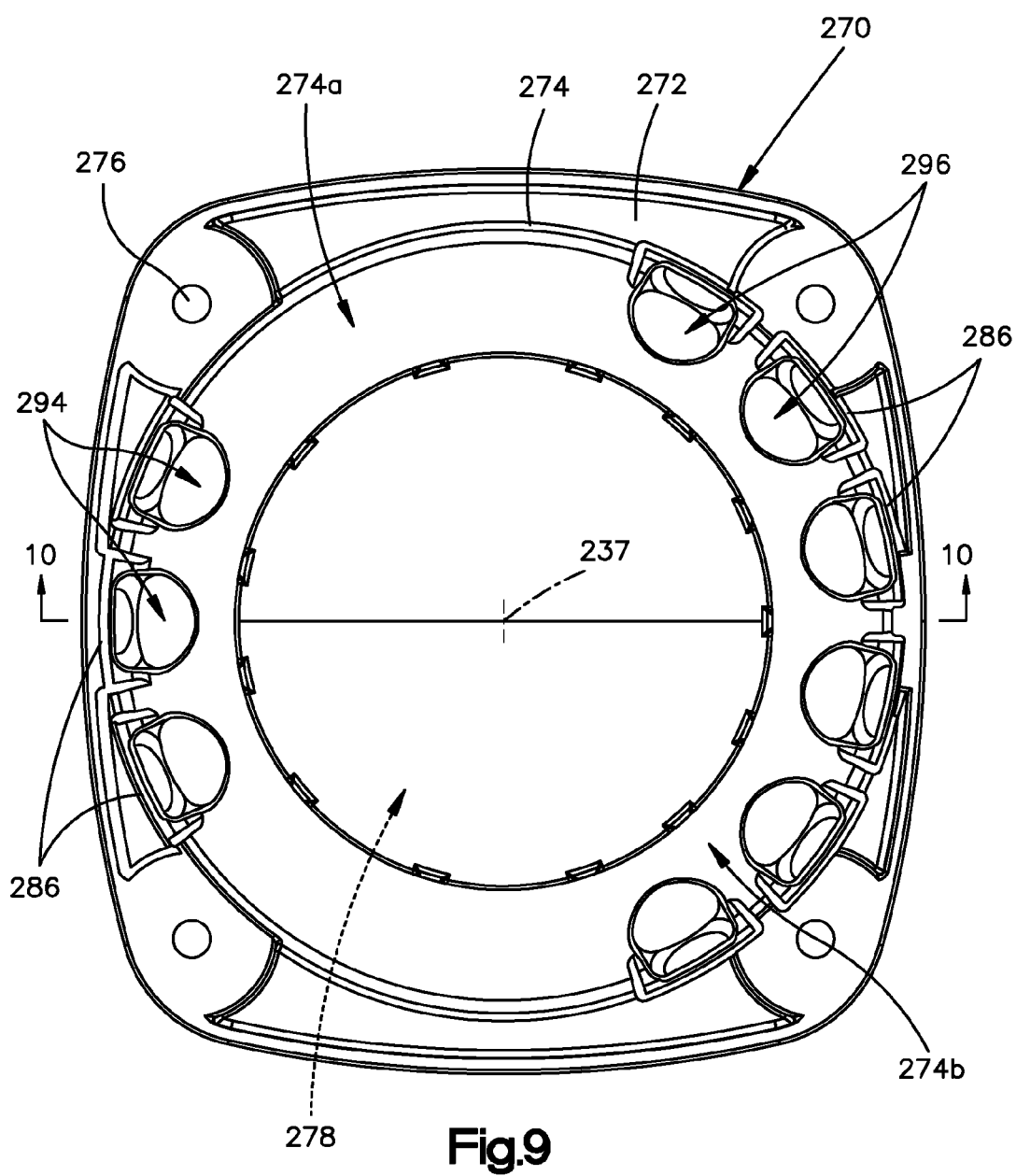
FIG. 9 is a top view of the portion of FIG. 8.
Figure 10:
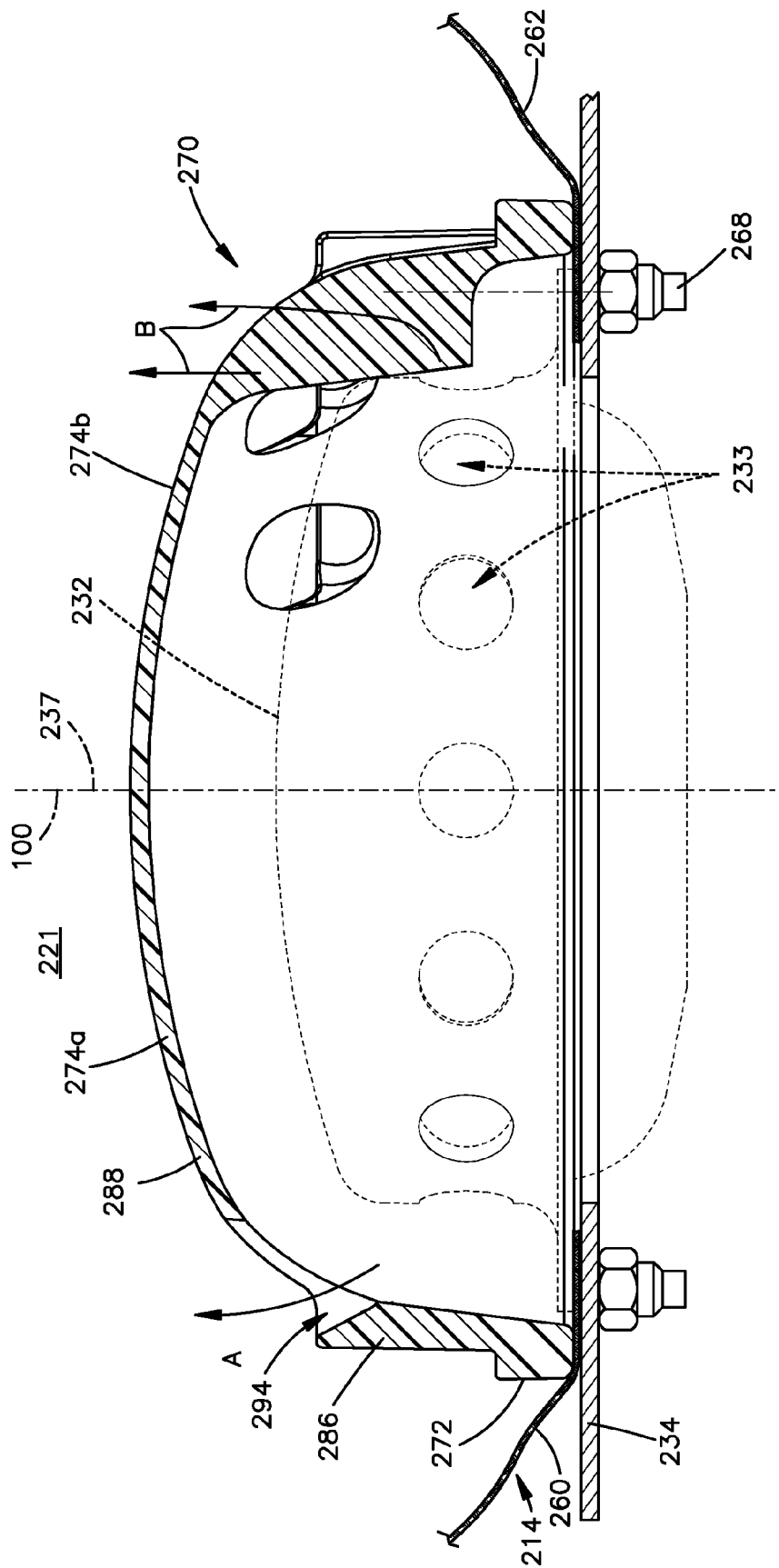
FIG. 10 is a sectional view taken generally along line 10-10 in FIG. 9 and illustrating an installed condition of the apparatus.

A retainer 270 according to a third embodiment of the present invention is illustrated in FIGS. 8-10. The retainer 270 of the third embodiment is similar to the retainer 170 of FIGS. 6-7, with the primary exception that the cover portion 274 of the third embodiment differs from that of the second embodiment. In particular, the openings in the cover portion 274 in the embodiment of FIGS. 8-10 include a plurality of openings 294 in the first half 274a of the cover portion and a plurality of openings 296 in the second half 274b of the cover portion.

The cover portion 274 has a domed construction with all the openings 294 and 296 extending entirely through the cover portion. Unlike the openings 94, 194 and 96, 196, respectively, all of the openings 294 and 296 are substantially the same size. Accordingly, the openings 294 and 296 are distributed in an uneven fashion relative to the first half 274a and the second half 274b of the cover portion 274 such that uneven volumetric flow rates are experienced out of the first and second halves of the cover portion.

As shown in FIG. 9, the first half 274a of the cover portion 274 includes a first number of openings 294 positioned generally along the circumference of the cover portion and the second half 274b of the cover portion includes a second number of openings 296 positioned generally along the circumference of the cover portion. The second number of openings 296 is greater than the first number of openings 294. Although three openings 294 and six openings 296, respectively, are illustrated in FIGS. 8-10, those having ordinary skill will appreciate that more or fewer openings may be provided in the first half 274a and/or the second half 274b of the cover portion 274 in accordance with the present invention. Those having ordinary skill will also appreciate that the openings 294 and 296 may be evenly or unevenly spaced about the respective halves 274a and 274b of the cover portion 274 along the circumference of the cover portion or spaced from the circumference.

In accordance with the present invention, the deflector portion 286 constitutes a plurality of discrete, spaced apart wall sections positioned around the cover portion 274. In particular, the deflection portion 286 includes sections corresponding to each of the openings 294 and 296 in the cover portion 274. For example, as shown in FIGS. 8-9, a discrete section of the deflector portion 286 is spaced radially outward from, and adjacent to, each of the three openings 294 and each of the six openings 296. Similar to the deflector portions 86, 186, each of the sections of the deflector portions 286 extends orthogonal to the base portion 272 and substantially parallel to the central axis 237 of the inflator 232 to direct inflation fluid away from the mouth of the air bag 214. Although FIGS. 8-9 illustrate that each of the openings 294 and 296 has a corresponding deflector portion 286, those having ordinary skill will understand that some of the openings 294 and/or the openings 296 may not have a corresponding deflector portion in accordance with the present invention.

During operation of the inflator 232, the inflation fluid exits the inflation outlets 233 uniformly within the cover portion 274. In the first half 274a of the cover portion 274, the inflation fluid flows through the first openings 294, strikes the deflector portions 286, and is directed upwards and substantially parallel to the central axis 237 and into the upper portion 260 of the air bag 214 in the direction A. In the second half 274b of the cover portion 274, the inflation fluid flows through the second openings 296, strikes the deflector portions 286, and is directed upwards and substantially parallel to the central axis 237 and into the lower portion 262 of the air bag 214 in the direction B. Since the first openings 294 are substantially the same size as the second openings 296, and there are more second openings than first openings, the volumetric flow rate of the inflation fluid out of the first half 274a of the cover portion 274 is smaller than the volumetric flow rate of the inflation fluid out of the second half 274b of the cover portion. Consequently, for a given period of inflation time, the upper portion 260 of the air bag 214 may receive a lower volume of inflation fluid than the lower portion 262 of the air bag to meet desired air bag inflation characteristics.

Figure 11:
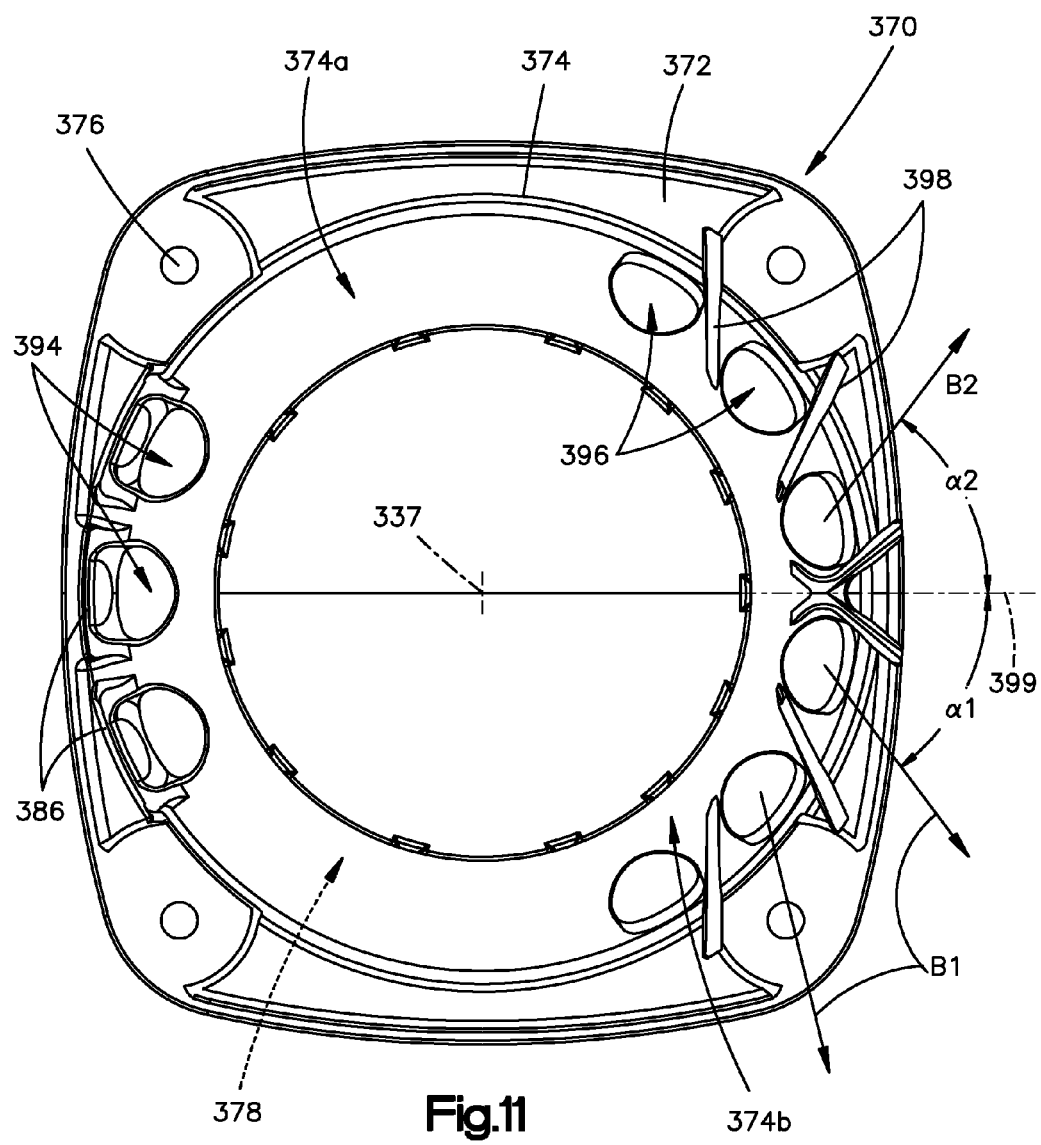
FIG. 11 is a top view of a portion of the apparatus of FIGS. 1 and 2 in accordance with a fourth embodiment of the present invention.
Figure 12:
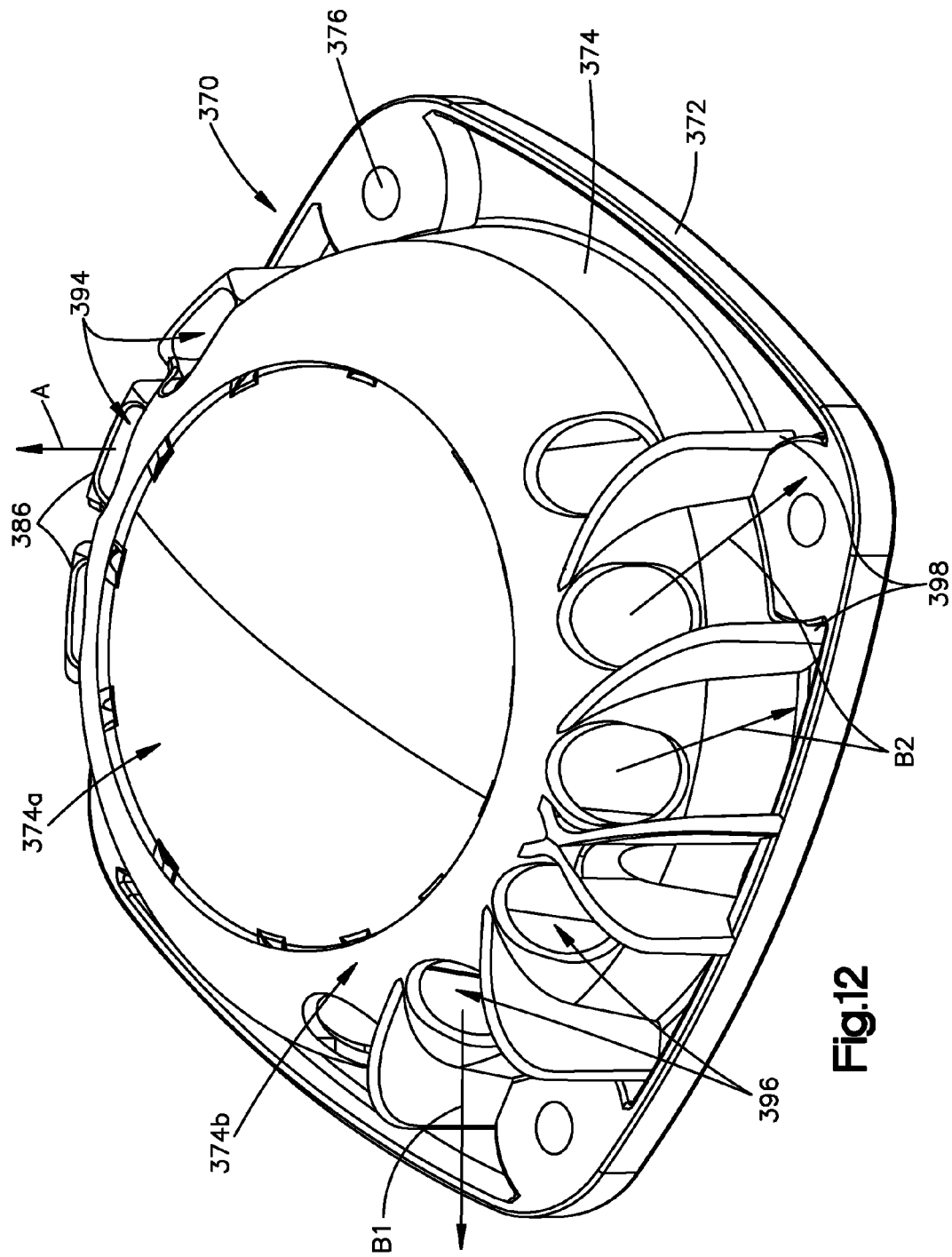
FIG. 12 is a perspective view of the portion of FIG. 11.

A retainer 370 according to a fourth embodiment of the present invention is illustrated in FIGS. 11-12. The retainer 370 of the fourth embodiment is similar to the retainer 270 of FIGS. 8-10, with the primary exception that the cover portion 374 of the fourth embodiment differs from the cover portion 274 of the third embodiment. In particular, each of the openings 396 in the second half 374b of the cover portion 374 in the embodiment of FIGS. 11-12 includes a fin 398—instead of a section of the deflector portion—for directing the inflation fluid away from the inflator in a plurality of directions parallel to the base portion 372.

Similar to the third embodiment, each of the openings 394 in the first half 374a of the cover portion 374 includes a corresponding section of the deflector portion 386 for directing inflation fluid exiting the opening 394 in a direction substantially parallel to the central axis 337 as indicated at A. The inflation fluid exiting the openings 396, however, is not directed in a direction substantially parallel to the central axis 337. Rather, the fin 398 positioned adjacent each opening 396 directs a portion of the inflation fluid in a direction $B_1$ at a first angle $\alpha_1$ relative to an axis 399 extending across and orthogonal to the first and second halves 374a, 374b of the cover portion 374 and a portion of the inflation fluid in a direction $B_2$ at a second angle $\alpha_2$ relative to the axis.

Figure 13:
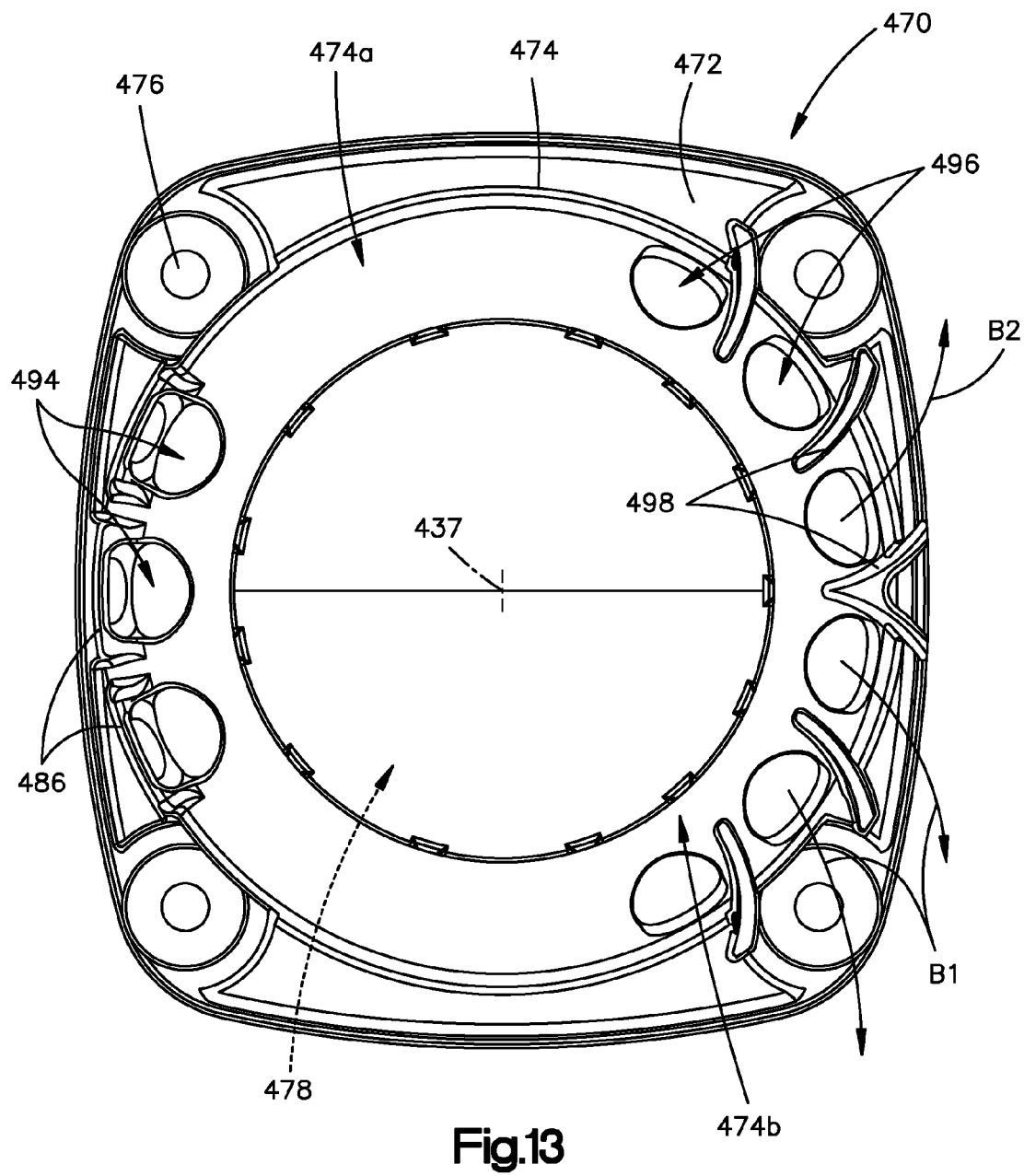
FIG. 13 is a top view of a portion of the apparatus of FIGS. 1 and 2 in accordance with a fifth embodiment of the present invention.

Similar to the deflector portion 386, each of the fins 398 extends substantially parallel to the central axis 327 of the inflator and transversely relative to the base portion 372. The fins 398 are angled relative to the axis 399 such that the inflation fluid exiting the second half 374b of the cover portion 374 is directed along the first and second angles $\alpha_1$, $\alpha_2$ substantially parallel to the base portion 372 of the retainer 370. According to the present invention, and depending upon particular inflation criteria, the fins 398 may be linear (FIGS. 11-12) or the fins 498 may be arcuate (FIG. 13) to direct the inflation fluid in this manner. Although FIGS. 11-12 illustrate that each of the openings 394 has a corresponding deflector portion 386 and each of the openings 396 has a corresponding fin 398, those having ordinary skill will understand that some of the openings 394 and/or the openings 396 may not have a corresponding deflector portion or fin, respectively, in accordance with the present invention.

During operation of the inflator (not shown), the inflation fluid exits the inflation outlets (not shown) uniformly within the cover portion 374. In the first half 374a of the cover portion 374, the inflation fluid flows through the first openings 394, strikes the deflector portions 386, and is directed upwards and substantially parallel to the central axis 337 and into the upper portion of the air bag (not shown) in the direction A. In the second half 374b of the cover portion 374, the inflation fluid exits the second openings 396, strikes the fins 398, and is directed into the lower portion of the air bag along the direction $B_1$ and the direction $B_2$.

The first angle $\alpha_1$ and the second angle $\alpha_2$ may be identical or different from one another. The direction $B_1$ and the direction $B_2$ may be orthogonal to one another, although those having ordinary skill will appreciate that the first and second angles $\alpha_1$ $a_2$ may have any configuration such as, for example, a configuration in which the directions $B_1$, $B_2$ are normal to the inflation outlets aligned with the second openings 396. Furthermore, those having ordinary skill will appreciate that the fins 398 may be configured to direct the inflation fluid in more or fewer directions than the two directions illustrated, and that those directions may be parallel to the base portion 372 or angled relative to the base portion.

Regardless, since the first openings 394 are substantially the same size as the second openings 396, and there are more second openings than first openings, the volumetric flow rate of the inflation fluid out of the first half 374a of the cover portion 374 is smaller than the volumetric flow rate of the inflation fluid out of the second half 374b of the cover portion. Consequently, for a given period of inflation time, the upper portion of the air bag may receive a lower volume of inflation fluid than the lower portion of the air bag to meet desired air bag inflation characteristics.

Those skilled in the art will appreciate that the configuration of the retainer may vary depending on a variety of factors, such as the vehicle architecture, space limitations within the vehicle, and the configuration of airbag module components, such as the inflator. Those skilled in the art will also appreciate that the deflector portion and the openings in the cover portion can be adapted or configured to accommodate these various alternative configurations of the retainer without departing from the spirit of the present invention.

From the above description of the invention, those skilled in the art will perceive improvements, changes and modifications. For example, the retainer could be used with a passenger frontal air bag. Such improvements, changes and modifications within the skill of the art are intended to be covered by the appended claims.

Having described the invention, the following is claimed:

1. An apparatus for helping to protect an occupant of a vehicle, the apparatus comprising:
    an inflatable vehicle occupant protection device having an upper portion and a lower portion;
    an inflator having a flange and inflation fluid outlets, the inflator being actuatable to provide inflation fluid through the inflation fluid outlets to inflate the protection device; and
    a retainer comprising:
        a base portion for clamping the flange of the inflator to a support member; and
        a cover portion having a deflector portion that extends transversely from the base portion and a top portion that extends transversely from the deflector portion,
    the cover portion including a plurality of openings for providing fluid communication between the inflation fluid outlets and the protection device, the deflector portion directing inflation fluid from the inflator into the protection device in a direction substantially parallel to a central axis of the inflator, the cover portion directing inflation fluid from a first half of the cover portion into the upper portion of the protection device at a first volumetric flow rate, the cover portion directing inflation fluid from a second half of the cover portion into the lower portion of the protection device at a second volumetric flow rate that is greater than the first volumetric flow rate.

2. The apparatus recited in claim 1, wherein the support member comprises a reaction plate.

3. The apparatus recited in claim 1, wherein the openings include a plurality of openings in the first half of the cover portion and a plurality of openings in the second half of the cover portion.

4. The apparatus recited in claim 3, wherein the second half of the cover portion includes more openings than the first half of the cover portion.

5. The apparatus recited in claim 3, wherein the deflector portion directs inflation fluid only from the openings in the first half of the cover portion into the protection device.

6. The apparatus recited in claim 3, wherein the deflector portion directs inflation fluid from the openings in the first half of the cover portion and the second half of the cover portion into the protection device.

7. The apparatus recited in claim 5 further comprising a plurality of fins corresponding to the plurality of openings in the second half of the cover portion, the plurality of fins directing inflation fluid in a direction substantially parallel to the base portion.

8. The apparatus recited in claim 7, wherein the fins direct the inflation fluid in a direction normal to the inflation fluid outlets.

9. The apparatus recited in claim 8, wherein the fins direct a first portion of the inflation fluid in a direction along a first angle transverse to an axis of the cover portion and a second portion of the inflation fluid in a direction along a second angle substantially perpendicular to the first angle.

10. The apparatus recited in claim 7, wherein the fins are arcuate.

11. The apparatus recited in claim 7, wherein the fins are straight.

12. The apparatus recited in claim 1, wherein the base portion further includes a vent opening for venting inflation fluid from the protection device.

13. The apparatus recited in claim 1, wherein the plurality of openings consists of a first opening in the first half of the cover portion and a second opening in the second half of the cover portion larger than the first opening.

14. The apparatus recited in claim 13 further comprising a vent opening for venting inflation fluid from the protection device, the second opening being positioned between the first opening and the vent opening.

15. The apparatus recited in claim 1, wherein the inflation fluid engages the deflector portion and is directed away from the protection device secured to the base portion of the retainer to help prevent damage to the protection device.

16. The apparatus recited in claim 1, wherein the deflector portion covers at least 75% of an area of the inflation fluid outlets aligned with at least one of the plurality of openings.

17. The apparatus recited in claim 1, wherein the deflector portion deflects inflation fluid away from the protection device secured to the base portion of the retainer.

18. The apparatus recited in claim 1, wherein the plurality of openings is provided in the base portion and the top portion of the cover portion.

19. An apparatus for helping to protect an occupant of a vehicle, the apparatus comprising:
   an inflatable vehicle occupant protection device having an upper portion and a lower portion;
   an inflator having a flange and inflation fluid outlets, the inflator being actuatable to provide inflation fluid through the inflation fluid outlets to inflate the protection device; and
   a retainer for receiving the inflator, the retainer comprising:
      a base portion for clamping the flange of the inflator to a support member; and
      a cover portion having a deflector portion that extends transversely from the base portion and a top portion that extends transversely from the deflector portion,
   the cover portion having a first half including a plurality of openings and a second half including a plurality of openings, the openings in the first and second halves providing fluid communication between the inflation fluid outlets and the protection device, the deflector portion comprising discrete wall sections spaced about the periphery of the inflator and corresponding with at least one of the inflation fluid outlets, the deflector portion directing inflation fluid from the inflator into the protection device in a direction substantially parallel to a central axis of the inflator, the cover portion directing inflation fluid from the first half of the cover portion into the upper portion of the protection device at a first volumetric flow rate, the cover portion directing inflation fluid from the second half of the cover portion into the lower portion of the protection device at a second volumetric flow rate that is greater than the first volumetric flow rate.

20. The apparatus recited in claim 19, wherein the deflector portion comprises discrete sections associated with only the openings in the first half of the cover portion, each of the openings in the second half of the cover portion being associated with a fin for directing the inflation fluid exiting the second half of the cover portion in a plurality of directions relative to an axis of the cover portion extending across the first half and the second half.

* * * * *